United States Patent
Levine et al.

(10) Patent No.: US 7,996,723 B2
(45) Date of Patent: Aug. 9, 2011

(54) CONTINUOUS, AUTOMATED DISCOVERY OF BUGS IN RELEASED SOFTWARE

(75) Inventors: Jonathan D. Levine, Rochester, NY (US); George Vigelette, Walworth, NY (US); Michael J. Evan, Webster, NY (US)

(73) Assignee: Xerox Corporation, Norwalk, CT (US)

(*) Notice: Subject to any disclaimer, the term of this patent is extended or adjusted under 35 U.S.C. 154(b) by 65 days.

(21) Appl. No.: 12/644,279

(22) Filed: Dec. 22, 2009

(65) Prior Publication Data

US 2011/0154109 A1    Jun. 23, 2011

(51) Int. Cl.
G06F 11/00 (2006.01)
(52) U.S. Cl. .......... 714/38.1; 714/39
(58) Field of Classification Search ........ 714/38.1, 714/38.12, 38.14, 39, 41; 717/120, 124, 717/126, 128
See application file for complete search history.

(56) References Cited

U.S. PATENT DOCUMENTS

| | | | | |
|---|---|---|---|---|
| 5,335,342 | A * | 8/1994 | Pope et al. | 714/38.13 |
| 5,754,760 | A * | 5/1998 | Warfield | 714/38.1 |
| 5,758,061 | A | 5/1998 | Plum | |
| 6,067,639 | A * | 5/2000 | Rodrigues et al. | 714/38.11 |
| 6,505,342 | B1 | 1/2003 | Hartmann et al. | |
| 7,380,239 | B1 * | 5/2008 | Srivastava et al. | 717/128 |
| 2009/0281839 | A1 * | 11/2009 | Lynn et al. | 705/3 |
| 2010/0325493 | A1 * | 12/2010 | Morimura et al. | 714/39 |

OTHER PUBLICATIONS

Norman E. Fenton and Martin Neil; "A Critique of Software Defect Prediction Models;" IEEE Transactions on Software Engineering; vol. 25, No. 5, Sep./Oct. 1999; http://web.cs.wpi.edu/-gpollice/cs562-s05/Readings/DefectPredictionCritique.pdf.
"Predicting Bugs in Code Changes Using SCM Information;" http://video.aol.com/video-detail/predicting-bugs-in-code-changes-using-scm-information/1895097696, Mar. 8, 2006.
"Software Testing;" http://en.wikipedia.org/wiki/Software_testing, Dec. 2009.
"Dynamic Program Analysis;" http://en.wikipedia.org/wiki/Dynamic_program_analysis, Oct. 2009.

* cited by examiner

*Primary Examiner* — Dieu-Minh Le
(74) *Attorney, Agent, or Firm* — Hoffmann & Baron, LLP (57) ABSTRACT

According to aspects illustrated herein, there is provided a method, system, and computing device for identifying bugs in a software application. The method provides for hosting the software application on a cloud server and providing the software application to a group of users and monitors usage of the software application. Next, new usage patterns are identified by identifying current usage patterns based on the monitoring are identified and comparing the current usage patterns to stored usage patterns. After that, bugs are identified by: 1) automatically generating a set of new test matrices based on the new usage patterns; 2) automatically running the set of new test matrices on the software application, while the software application is being used; 3) recording error messages generated; and 4) correlating the error messages with the new usage patterns to identify the bugs. Then, a reporting message is generated to report the identified bugs.

26 Claims, 5 Drawing Sheets

CONTINUOUS, AUTOMATED DISCOVERY OF BUGS IN RELEASED SOFTWARE

TECHNICAL FIELD

This disclosure generally relates to a method for increasing the quality of released software applications or services by identifying and reporting "bugs" in software applications or services before customers identify the bugs.

BACKGROUND

All software applications have bugs. The bugs may consist of an error, flaw, mistake, failure, or fault that produces an incorrect or unexpected result, or causes the software application to behave in unintended ways. Test organizations normally try to eliminate all bugs before software is released. But as software becomes more complex and more ubiquitous, the number of bugs increases and it becomes more unlikely that all or even most bugs will be found before the software application is released. Additionally, there are some times when a quick release of software applications and/or services is necessary, resulting in fewer bugs being caught prior to the release and an increased likelihood that a customer will discover a bug.

Traditionally, technical support organizations have helped customers with problems reactively by fixing a bug after a customer finds the bug in the released software. However, one of the worse scenarios for the software developers, especially in a services product, is for a customer to discover a bug. When software is created for a services product, the quality of the service is the primary problem encountered by the service marketing. Therefore, it would be advantageous to provide a method for identifying and providing the ability to fix the bugs after the software application is released, but prior to a customer's discovery of the bug.

SUMMARY

According to aspects illustrated herein, there is provided a method for identifying bugs in a software application. The method provides for hosting the software application on a cloud server. The software application and the cloud server support use of the software application by multiple users simultaneously. Next, the method provides the software application to a group of users and monitors usage of the software application by the group of users. After that, one or more current usage patterns are identified based on the monitoring and comparison of the one or more current usage patterns to one or more stored usage patterns. If the one or more current usage patterns do not match the one or more stored usage patterns, the one or more current usage patterns are recorded as the one or more new usage patterns. Then, one or more bugs are identified by the following: 1) automatically generating a set of new test matrices based on the one or more new usage patterns; 2) automatically running the set of new test matrices on the software application while the group of users continue to use the software application; 3) recording one or more error messages generated by the software application resulting from running the set of new test matrices on the software application; and 4) correlating the one or more error messages being generated by the software application with the one or more new usage patterns to identify the one or more bugs. Finally, a reporting message is generated to report the one or more identified bugs.

According to other aspects illustrated herein, there is provided a system for identifying bugs in a software application that is capable of being used by multiple users simultaneously. The system includes a cloud server, a database, and a neural network. The software application may be used by multiple users simultaneously. The cloud server hosts the software application, and the software application is provided to a group of users through the server. The database stores one or more sets of usage data from the software application. The one or more sets of usage data include one or more current usage patterns and one or more error messages. The neural network is operatively connected to a cloud server and configured to receive the one of more sets of usage data from the database. The neural network analyzes the one or more sets of usage data by comparing the one or more current usage patterns to one or more stored usage patterns. If the one or more current usage patterns do not match the one or more stored usage patterns, the one or more current usage patterns are recorded as one or more new usage patterns. The neural network also identifies one or more bugs using the following steps: automatically generating a set of new test matrices based on the one or more new usage patterns; automatically running the set of new test matrices on the software application while the group of users continue to use the software application; recording the one or more error messages generated by the software application resulting from running the set of new test matrices on the software application; and correlating the one or more error messages being generated by the software application with the one or more new usage patterns to identify the one or more bugs. Thereafter, the neural network generates a reporting message to report the one or more identified bugs.

According to other aspects illustrated herein, there is provided a computing device for identifying bugs in a software application including a neural network module and a reporting module. The neural network module includes a neural network operatively connected to a cloud server. The cloud server is configured to host the software application and provide the software application to a group of users. The software application is capable of being used by multiple users simultaneously. The neural network is further configured to receive the one of more sets of usage data from the database. The one or more sets of usage data are analyzed by comparing the one or more current usage patterns to one or more stored usage patterns. If the one or more current usage patterns do not match the one or more stored usage patterns, the one or more current usage patterns are recorded as one or more new usage patterns. Then, the neural network identifies one or more bugs using the following steps: automatically generating a set of new test matrices based on the one or more new usage patterns; automatically running the set of new test matrices on the software application while the group of users continue to use the software application; recording the one or more error messages generated by the software application resulting from running the set of new test matrices on the software application; and correlating the one or more error messages being generated by the software application with the one or more new usage patterns to identify the one or more bugs. After that, a reporting message is generated to report the one or more identified bugs. The reporting module sends and receives information related to the one or more identified bugs, including the reporting message.

Additional features and advantages will be readily apparent from the following detailed description, the accompanying drawings, and the claims. It is to be understood, however, that the drawings are designed as an illustration only and not as a definition of the limits of the disclosure.

BRIEF DESCRIPTION OF THE DRAWINGS

Like reference symbols in the various drawings indicate like elements.

DETAILED DESCRIPTION

The method, system, and computing device disclosed herein provide for increasing the quality of released software applications and services. The method, system, and computing device provide the ability to identify, report, and fix bugs in the software application prior to identification of the bugs by the customers. The method, system, and computing device provided herein were designed using standard characteristics of Web 2.0 software and existing neural network technology.

As used herein, the phrase "software application" refers to programs designed to help a user perform a task. The phrase includes software, computer programs, software services, and applications. Examples include word processors, spreadsheets, media players, and database applications.

As used herein, the phrase "group of users" refers to one or more users, including human users and computing devices.

As used herein, the phrase "usage patterns" refers to usage of features of the software application, usage of the settings of the software application, conditions of the usage of the features of the software application, and conditions of the usage of the settings of the software application.

As used herein, the phrase "stored usage patterns" refers to usage patterns identified and tested prior to the release of the software application.

As used herein, the phrase "new usage patterns" refers to usage patterns not recognized by software developers, testers, and/or technical support prior to the release of the software application.

As used herein, the phrase "error message" refers to a problem discovered in the software that can be identified as such but that does not have a specific error code.

As used herein, the phrase "reporting message" refers to the transfer of information relating to usage data, usage patterns, error messages, and/or test matrices (e.g. to a person or team that can fix the reported problem).

As used herein, the phrase "usage data" refers to usage patterns, error messages, a source of an error message, and a time stamp on an error message.

As used herein, the term "database" refers to one or more databases.

As used herein, the phrases "test matrix" or "test matrices" define conditions that must be tested to verify the proper functioning of the software application on a system. Each item tested in the test matrix is designed to discover or create a metric that will help achieve a testing goal. The testing goals include showing an interrelationship between functional requirements or events and the actual operation of the system.

As used herein, the phrase "cloud server" refers to a server on a network that enables a software application to be available online and accessible from a web browser while the software application and data associated therewith are also available using a direct connection to the server.

As used herein, the term "neural network" refers to a type of artificial intelligence that attempts to imitate the way a human brain works. Rather than using a digital model, in which all computations manipulate zeros and ones, a neural network works by creating connections between processing elements, the computer equivalent of neurons. The organization and weights of the connections determine the output. Neural networks are particularly effective for predicting events when the networks have a large database of prior examples to draw on. Neural networks may be simulated on digital computers.

As used herein, the term "bug" refers to a problem, such as a programming error, that causes difficulties for a user or a low job success rate. The term bug may further refer to changes or updates to software applications that will result in modifications and/or additional features.

As used herein, the term "fix" refers to a solution to a bug.

The identification of bugs in software applications after the software applications are released using artificial neural networks (ANNs) is disclosed herein. ANNs simulate biological neural networks. Biological neural networks are very complex and provide sufficient processing power to perform complicated biological functions in living beings. ANNs attempt to bring the computing power of biological neural networks to bear on complicated computing problems.

ANNs are useful because they can be used to infer a function from observation of data. This is particularly useful in applications where the complexity of the data or task makes the design of such a function by hand impractical. ANNs are also particularly good at identifying patterns. The ability of the ANNs to mine data and recognize patterns makes the use of ANNs useful in the process of identifying bugs in software applications. Specific details and examples of the characteristics of ANNs are described below.

The use of neural networks to identify bugs in software applications depend on the existence of data generated when customers are using the software application, after the software application is released. One method for obtaining such data is through the use of hosted software applications, such as a cloud platform. The "cloud" platform may be public or private. Examples of cloud platforms include: Amazon Web Services, Microsoft's Azure, and Google Apps.

The reason for requiring the software applications or services to be hosted on a cloud is that the data generated by all users must be efficiently collected and collated. If the all users are working on the same cloud platform, the task of collecting and collating is accomplished in a relatively simple manner. If the users are spread out among various clients, it is more difficult to ensure that all of the usage data is being collected.

A further reason for hosting the software applications or services on a cloud platform is that some situations of the disclosure provide for the neural network acting as a user of the software application. Requiring the neural network to access the software application to run test matrices that it has generated or that have been supplied. The test matrices must be run on the same software application and on the same platform that the users are using. Yet a further reason for hosting the software applications or services on a cloud platform includes the ability to efficiently fix the bug reported by the neural network on the actual running software application without disrupting the users and without releasing a new version or service patch.

In order for the ANNs to recognize patterns, the ANNs must be trained. The training is generally referred to as learning. Learning may include the following sequence of events: (1) stimulation by an environment in which the network is embedded; (2) changes in free parameters of the network as a result of stimulation; and (3) improved performance by responses in a new way to the environment. Learning algorithms, which include a prescribed set of well-defined rules, are used to enable the ANNs to learn. Various learning algorithms exist, all having the common goal of adjusting the connection weights among the network's nodes.

In particular, the ANNs may use supervised learning and unsupervised learning. When using this combination, the ANNs first receive supervised learning. During supervised learning, the network will be trained with known test cases (or test matrices). Supervised learning requires an external source of information in order to adjust the network. The network is trained by providing an input to the network and matching output patterns. These input-output pairs can be provided by an external teacher or by the system which contains the network which would be self-supervised.

Next, the ANNs may use unsupervised learning, also known as self-organization. In unsupervised learning, there is no external source that overlooks the learning process. Instead, the network is adjusted through internal monitoring of performance. The output is trained to respond to clusters of patterns within the input. During unsupervised learning, the network is supposed to discover statistically alien features of the input population. Unlike supervised learning, there is no set of categories or classes in which the patterns are to be classified. Rather the network in unsupervised learning must develop its own representation of the input stimuli. Specifically, the ANNs collect and organize usage data during unsupervised learning and learn new patterns of usage and results of the new patterns of usage.

Figure 1:
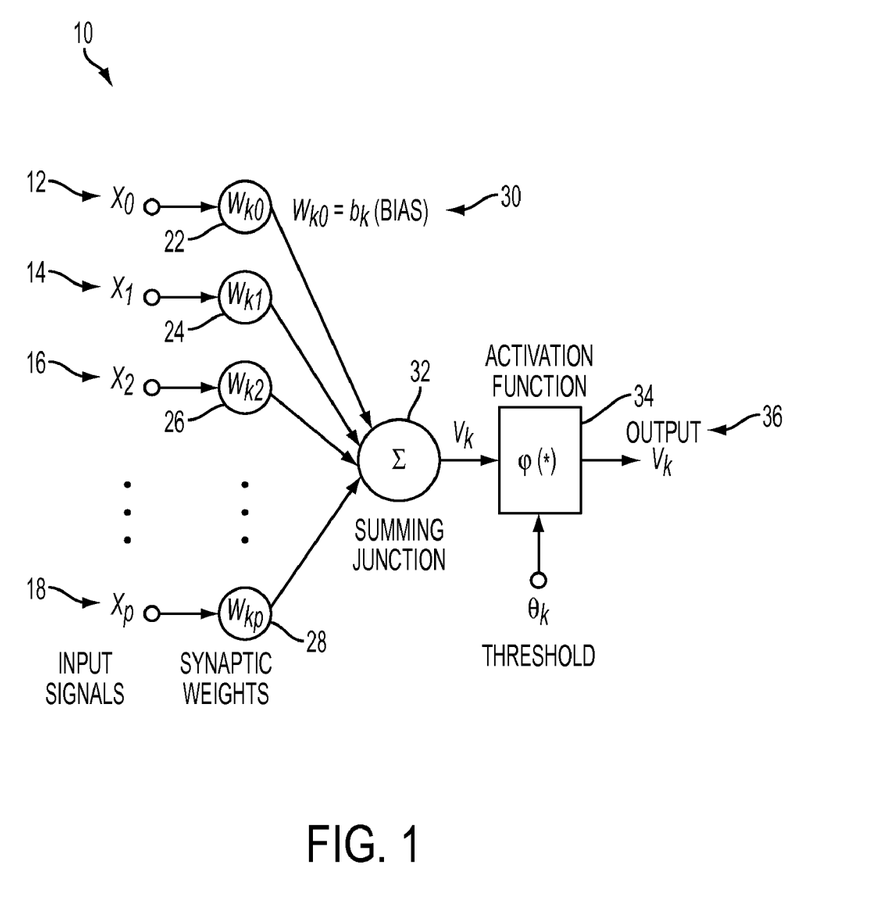
FIG. 1 illustrates an example of a neural network that is known in the art.

The ANNs for each software application being monitored for errors will be similar and vary only in the number of inputs. The ANNs will reflect a known Neural Network, such as the Kohonen model. FIG. 1 shows a typical mathematical model of a modeled neuron in a neural network 10. The network 10 is an n-dimensional network, where n is the number of inputs, as illustrated by $x_0$ (12), $x_1$ (14), $x_2$ (16), through $x_p$ (18). Each modeling neuron in the network 10 receives each of the inputs defined and produces one output. The modeled neurons work on weighted values of the input using weight factors of the network (10) (i.e., $w_{k0}$ (22), $w_{k1}$ (24), $w_{k2}$ (26), $w_{kp}$ (28)), which are initialized to a random value, such as $w_{k0}=b_k$ (bias) (30). A summation, $v_k$ (32), is then performed summing the weighted inputs of $w_{k0}$ (22) through $w_{kp}$ (28). The network 10 is trained by providing test data, which modifies the weighted values for each of the modeled neuron nodes. This will allow for the activation 34 of the classification of testing patterns by the ANNs.

The example uses supervised learning taking on the form of: (x, y), x ε TX, y ε TY, given a set of example pairs x, y, with the goal of finding a function f: X→Y. The mapping implied by the data is inferred. Using the concept of competitive learning, new data can be used for unsupervised learning using the following equation (or variant of): $\Delta w_{ij}=k(x_i-w_{ij})$, where k represents the learning coefficient. So all neurons in the neighborhood $N_x$ to neuron $x_{do}$ have their weights adjusted. During training, k and $N_x$ are adjusted by splitting the training into two phases. For example, phase 1 reduces down the learning coefficient from 0.9 to 0.1 and the neighborhood ($N_x$) will be reduced from half the diameter of the network 10 down to the immediately surrounding cells ($N_x=1$). After the completion of phase 1, phase 2 reduces the learning coefficient from 0.1 to 0.0 over double or more the number of iterations in phase 1. The neighborhood value ($N_x$) is then fixed at 1. The two phases allow the network 10 to first determine the category with the first phase and then fine-tuning the network 10 to a more accurate representation of the categorization and output $v_k$ (36) with phase 2.

Figure 2:
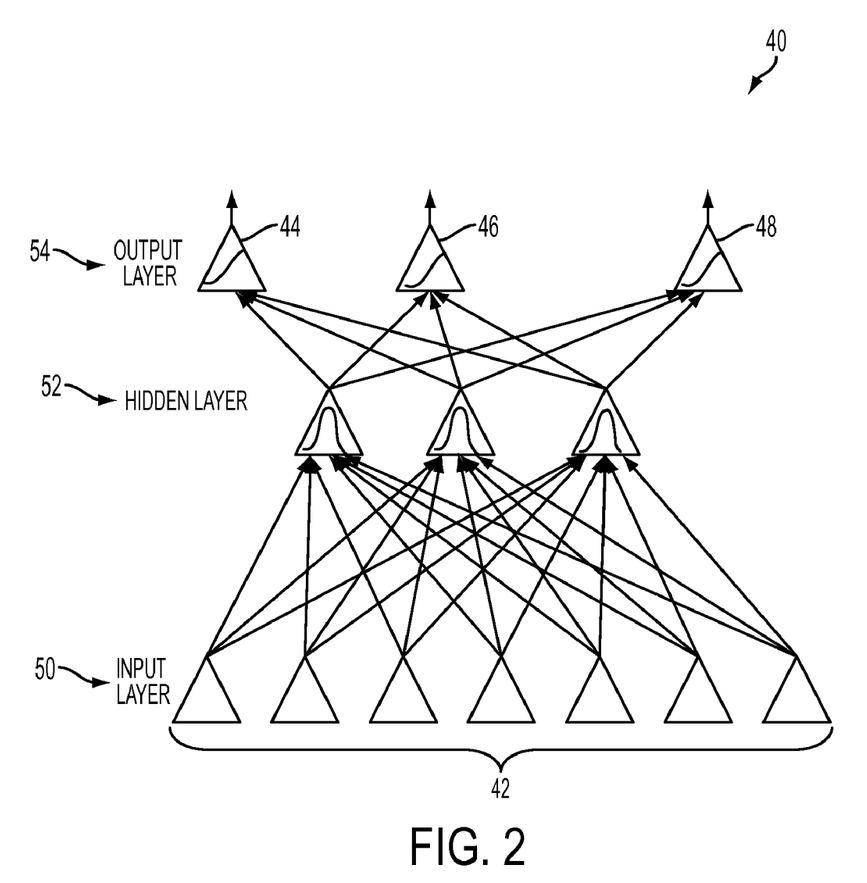
FIG. 2 illustrates an example of a multi-layer neural network that is known in the art.

In particular, the ANNs used herein are multi-layer neural networks 40, as shown in FIG. 2. The multi-layer neural network 40 makes interpreting the network output simple since only one model neuron will fire per input set 42 after training. The outputs are classified and then the output is detected as being a success 44, failure 46, or performance degradation 48. For example, the multi-layer neural network 40 includes an input layer 50 with the input set 42. Above that is a hidden layer 52 for interpreting the inputs. This network is shown having one hidden layer 52, but may include multiple hidden layers 52. The addition of hidden layers 52 will increase the accuracy of the data interpretation proportionally, as the number of hidden layers 52 increases. Above the hidden layer 52 is the output layer 54, which outputs one of three possibilities of success 44, failure 46, and performance degradation 48.

Multi-layer neural networks 40 achieve higher levels of computation capability than a traditional single layer neural network with an unsupervised learning mode. For purpose discussed herein, the ANNs will reside outside the software applications being used and tested; thus, it will reside either on the same server or a different server. However, the ANNs will be capable of accessing the data the software application generates to analyze the data and the software application itself to run test matrices on the software application.

Figure 3:
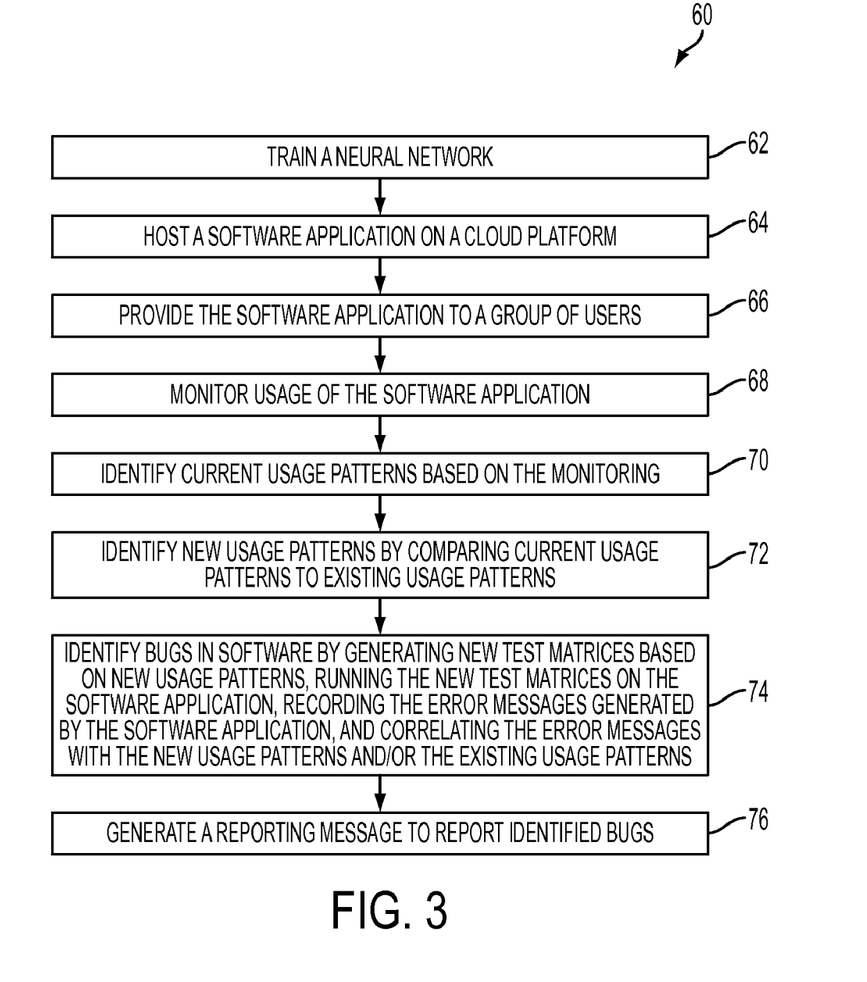
FIG. 3 provides a method for identifying bugs in a released software application.

FIG. 3 provides a method 60 for identifying bugs in a released software application. In step 62, software developers train a neural network. The training includes using supervised learning to categorize usage patterns and results discovered into a self organizing map. The ANNs are trained with known test cases and their results for the system under inspection.

Next, the software application is hosted on a cloud server in step 64 and provided to a group of users in step 66. As the software application is accessed and used, step 68 monitors usage the software application and current usage patterns are identified in step 70. Once trained, the ANNs are trained to continuously collect usage data in relation to a user's usage of the system. The data collected includes structured descriptions of service and feature usage and errors generated by the software application.

Examples of data related to the services and features include: 1) what services and features do users use, in what order and combinations, and with what settings; 2) what services and features does the software application automatically invoke and in what order and combination; 3) what errors are being generated; and 4) how are people using the hosted software application and services and in which markets. Examples of data related to errors generated include: 1) what errors (including performance errors) have occurred in the course of using the software application; 2) in what combinations do those errors occur in actual use; 3) what errors are associated with which combination of features and services in actual use; 4) criteria used to determine whether the frequency of an error is considered significant and whether the severity of an error is considered significant; and 5) a time stamp associated with the error.

Subsequently, new usage patterns are identified in step 72 by comparing the current usage patterns to stored usage patterns. The new usage patterns are identified during the unsupervised learning. Unsupervised learning creates new categories for patterns and results that are not categorized or fall outside of the known categories. Based on the newly created categories of usage patterns and predictive analysis, the ANNs may create additional new usage patterns and new categories of classification.

The steps of monitoring the usage of the software applications and collection of usage data allow the ANNs to learn new patterns and results that were not part of the ANNs' original learning sequence. The new patterns allow for the ANNs to learn exactly how users are actually using the system, which may not have been perceived during development and testing.

After that, in step 74, the new usage patterns are then used to identify bugs in the software application. The bugs are identified by generating new test matrices based on the new usage patterns, running test matrices on the software application based on the new usage patterns, and correlating the new usage patterns and stored usage patterns with one or more errors being generated by the software application using the ANNs. Specifically, the ANNs use the knowledge obtained by usage of the software applications and the supervised learning (during the training) to perform predictive analysis. Using predictive analysis, the ANNs can detect new usage patterns and test the system automatically. The ANNs will be able to report new usage patterns that fail, prior to the end user encountering these errors.

The ANNs will test the software applications with the new usage patterns to determine the results. The results of failure by the software applications will be reported for further analysis. The ANNs will continuously perform testing of known usage patterns along with discovered or predicted new usage patterns so that the software applications can determine failures prior to the user discovering errors. All automated testing will be captured for the purpose of reporting and further analytics.

Then, a reporting message is generated to report the identified bugs in the software application in step 76. If the errors meet a reporting standard the results will be reported. For example, error reporting may be necessary when the number of errors is statistically significant, the errors meet a predefined severity criteria, or the errors include system degradation problems. Reporting may result in no action, analysis, and/or correction of the bug by a member of technical support team, such as a software developer, technical support for a product, and/or an information technology department. The reporting may further provide for messages to be sent to the neural network indicating no action, analysis, correction of the bug, and/or any additional information relating to the status of the bug (i.e., flagging bugs that are or are not fixed).

Figure 4:
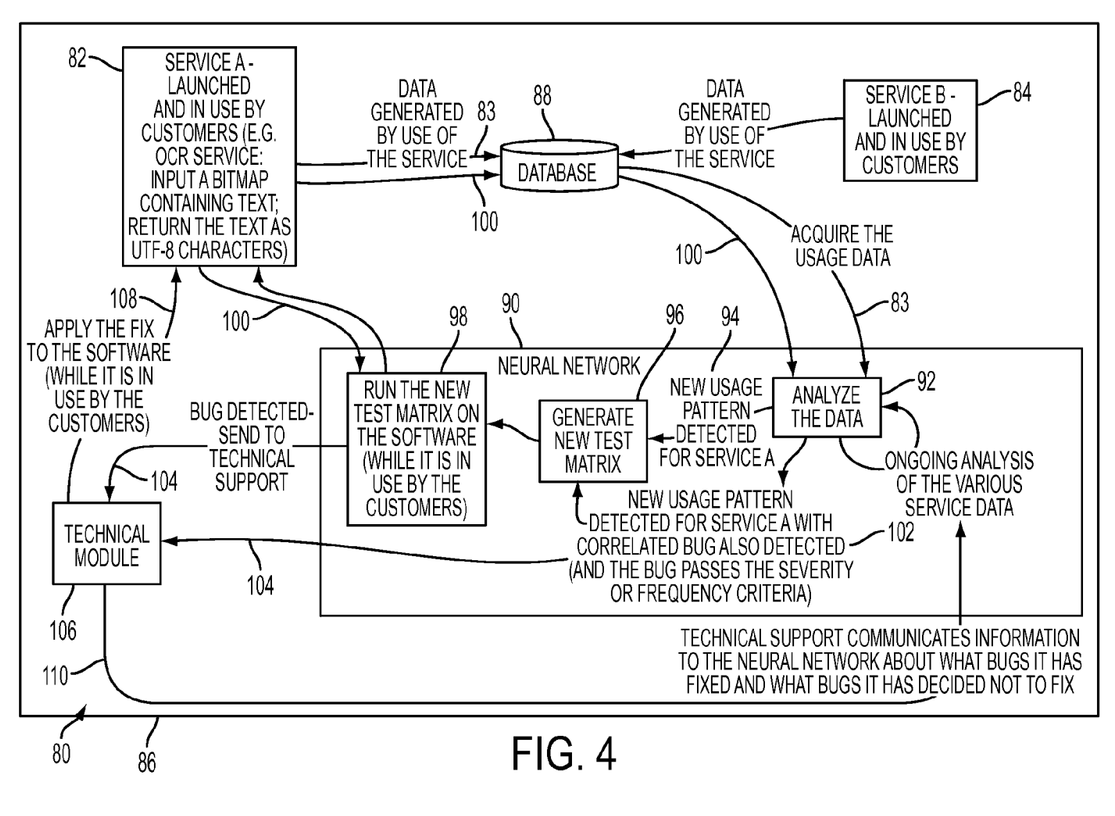
FIG. 4 illustrates a system for use with the method of FIG. 3.

FIG. 4 provides a system 80 for use with the method 60 of FIG. 3 to identify bugs in a software application. This is an exemplary system 80 run on a cloud server 86; however, the system 80 may alternatively be run on a network. The system 80 may include one or more software applications 82, 84, the server 86, a database 88, and a neural network 90.

The one or more software applications 82, 84 capable of being used by multiple users simultaneously. The server 86 being configured to store the one or more software applications 82, 84. The one or more software applications 82, 84 are provided to a group of users through the server 86. The database 88 being configured to store usage data from the software applications 82, 84. The usage data includes current usage patterns 83 and error messages 100 with information relating to a source of the error message 100 and a time stamp on the error message 100. The usage patterns may include usage of features of the software applications 82, 84, usage of the settings of the software applications 82, 84, conditions of the usage of the features of the software applications 82, 84, and conditions of the usage of the settings of the software applications 82, 84.

For each software application 82, 84, the neural network 90 is configured to receive and analyze the one or more sets of usage data from the database 88. For example, the one or more sets of usage data from Service A or software application 82, provides current usage patterns 83 and error messages 100. The analysis begins with the comparison of the one or more current usage patterns 83, extracted from the usage data, to one or more stored usage patterns, with the one or more stored usage patterns being associated with the software application 82 prior to the software application 82 being provided to the group of users. If the one or more current usage patterns 83 do not match the one or more stored usage patterns 94, the one or more current usage patterns 83 are recorded as one or more new usage patterns. Alternatively, if the one or more current usage patterns 83 match the one or more stored usage patterns, the current usage patterns 83 are recorded as the one or more stored usage patterns. The action of recording the one or more stored usage patterns during comparison may include, for example, copying the data to the database 88, attaching a tag or other electronic indicator next to the data as is known to one skilled in the art, and/or ignoring the data and continuing the analysis of the usage data as it is collected.

Next, the neural network 90 identifies bugs by analyzing 92 usage data. First, the neural network 90 identifies the one or more new usage patterns 94 detected and automatically generates a set of new test matrices 96 based on the one or more new usage patterns 94. After that, the neural network 90 automatically runs 98 the set of new test matrices 96 on the respective software application 82, while the group of users continue to use 98 the software application 82. Then, the neural network 90 records error messages 100 generated by the software application 82 resulting from the set of new test matrices 96. The error messages 100 may be recorded to the database 88 and then sent to the neural network 90 for further analysis or be reported directly to the neural network 90. Finally, the neural network 90 correlates 102 the error messages 100 being generated by the software application 82 with one or more selected from the group consisting of the one or more new usage patterns and the one or more stored usage patterns to identify bugs.

The bugs identified by the neural network 90 may then be reported through the generation of reporting messages 104. The reporting messages 104 report identified bugs based on a reporting standard, such as severity or frequency criteria. The reporting messages 104 may be delivered to a technical module 106. For example, the technical module 106 may consist of a group of persons providing technical support, software developers, or a system administrator. The reporting messages 104 may selectively be fixed by applying a fix 108 to the software application 82 or some reporting messages 104 may be ignored. The technical module 106 may further provide information 110 to the neural network 90 indicating the bugs that were fixed and the bugs that are not going to be fixed.

The neural network 90 does not have to run all the time. If no bugs are found, the neural network 90 may stop running. Since the neural network 90 is initially configured to learn, all the learned aspects remain irregardless of whether the neural network 90 is running. Thus, the usage data previously obtained does not have to be continually accessed in order to remain in the neural network 90.

Furthermore, the neural network 90 does not require constant access to the database 88. For example, if no new usage data is being generated, the neural network 90 does not need to collect data. Moreover, the generation of new test matrices 96 will cease when no new usage data exists, since it is unnecessary to attempt to generate 96 new test matrices without new usage data.

To ensure proper collection of usage data and automatic testing of the software applications 82, 84, the system 80 used with the ANNs must meet the following requirements. First, the system 80 must adhere to a data collection pattern for collection of usage data from the system 80, and the system 80 must be capable of being tested without a user interface.

Next, the non-user interface must provide for precise simulation of all user actions, such as if the system 80 contains a number keypad the non-user interface must provide a method for key-down and key-up of each key on the keypad to simulate a key process. Simulating every system action precisely is imperative. If you simulated a key press is simulated generally with a key press method the ANNs may not be able to simulate a user pressing two buttons simultaneously. Additionally, the data collected must be precise to enable the ANNs to effectively learn usage patterns of the system 80. The usage patterns will ultimately aid in the analysis and prediction of new usage patterns. Furthermore, the system 80 must be configured to collect data on errors associated with the new usage patterns.

Figure 5:
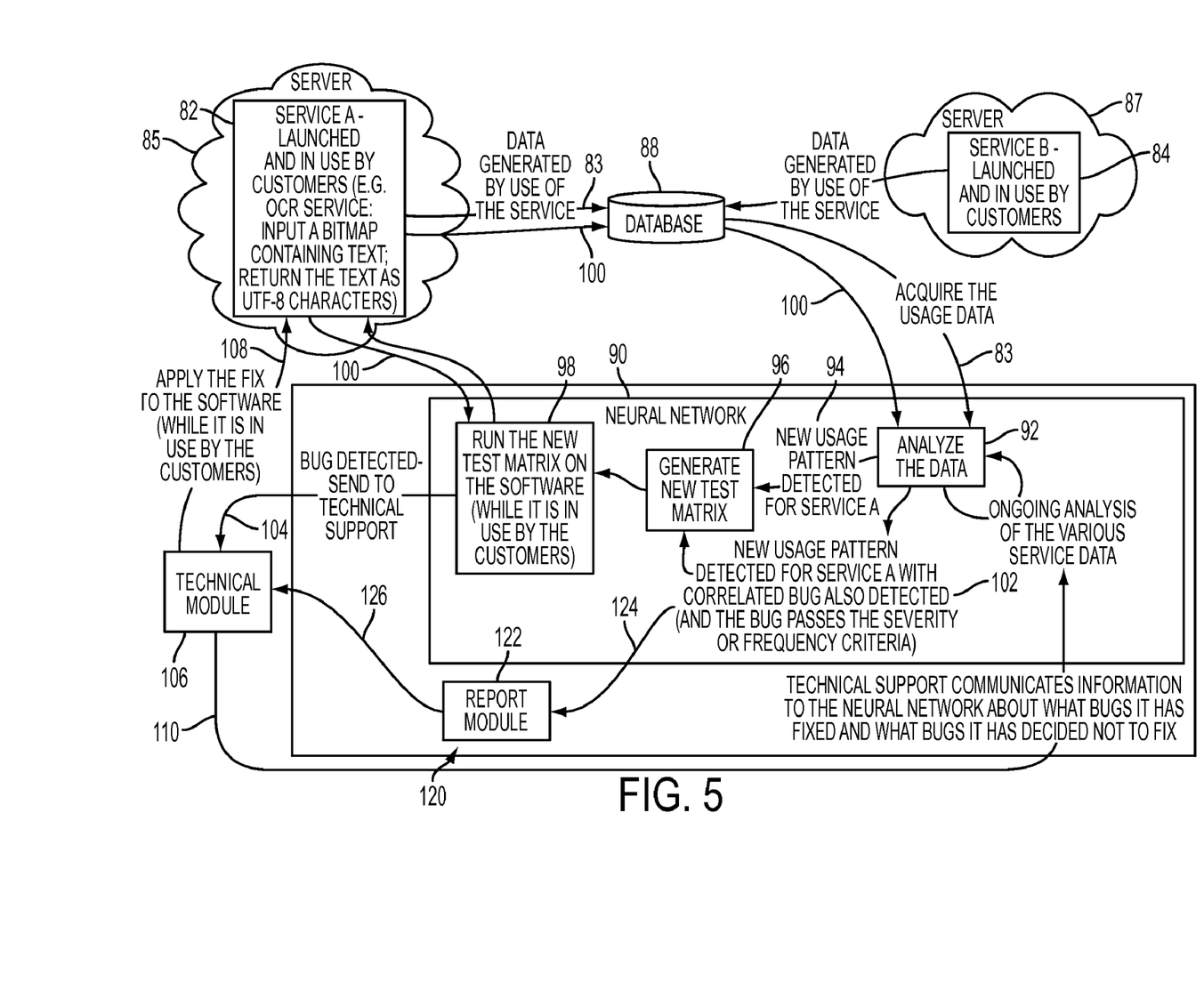
FIG. 5 illustrates a computing device for use with the method of FIG. 3.

FIG. 5 further provides a computing device 120 for identifying bugs in software applications 82, 84. The software applications 82, 84 are provided to a group of users through servers 85, 87. The software applications 82, 84 must be capable of being used by multiple users simultaneously.

The computing device 120 of FIG. 5 includes a neural network 90 and a reporting module 122. The neural network 90 is configured to receive usage data including one or more current usage patterns 83 and one or more error messages 100 from one or more software applications 82, 84, either directly or indirectly through a database 88. The neural network 90 analyzes the one or more current usage patterns 83 by comparing the one or more current usage patterns 83 to one or more stored usage patterns. The one or more stored usage patterns are established by the neural network 90 during supervised learning and prior to the software applications 82, 84 being provided to the group of users. The comparison includes determining if the one or more current usage patterns 83 match the one or more stored usage patterns. If the one or more current usage patterns 83 do not match the one or more stored usage patterns, the one or more current usage patterns 83 are identified as one or more new usage patterns detected 94. Alternatively, if the one or more current usage patterns 83 match the one or more stored usage patterns, the one or more current usage patterns 83 are recorded as the one or more stored usage patterns.

Subsequently, the neural network 90 identifies bugs by 1) automatically generating a set of new test matrices based on the one or more new usage patterns 96; 2) automatically running the set of new test matrices on the software application 82 while the group of users continue to use 98 the software application 82; 3) recording one or more error messages 100 generated by the software application 82 resulting from the set of new test matrices; and 4) correlating the error messages 100 generated by the software application 82 with one or more selected from the group consisting of the one or more new usage patterns and the one or more stored usage patterns to identify the one or more bugs 102.

After identifying the bugs, data relating to the bugs 124 is sent from the neural network 90 to the reporting module 122, which is configured for sending and receiving information related to the identified bugs. The reporting module 122 may generate a reporting message 126 to report the identified bugs. The generation of the reporting message 126 is based on a reporting standard, such as severity or frequency. The reporting module 122 may then send the generated messages 126 to the technical module 106 for further analysis and/or to apply a fix 108 to the software application 82.

The benefits of the method, system, and computing device include providing increased quality of released software applications or services by identifying bugs in the software applications, reporting those bugs, and enabling the application of a fix to the software applications prior to a customer discovering the bugs. Using the method, system, and computing device provided herein allows developers of the software applications and services to offer proactive assistance in predicting bugs in released software applications. The software provides error detection from actual use cases (the usage data), which allows the developers to become active participants in preventing customers from discovering bugs and improving the quality of the software applications. The results include increasing the quality of the software applications and increasing customer satisfaction.

A further benefit includes providing developers of the software applications with new insights on useful updates to the software applications due to the monitoring of the innovating and evolving uses of the software applications. Such data, relating to usage of the software applications, enables the developers to see their entire market since the usage data generated provides information about how the software applications are being used by customers. Furthermore, the actual usage patterns may efficiently and accurately detect more errors in the software applications than the theoretical test matrices that were used prior to release of the software applications.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A method for identifying bugs in a software application comprising:
    hosting the software application on a cloud server, wherein the software application and said cloud server support use of the software application by multiple users simultaneously;
    providing the software application to a group of users;
    monitoring usage of the software application by said group of users;
    identifying one or more current usage patterns based on said monitoring;
    comparing said one or more current usage patterns to one or more stored usage patterns, wherein if said one or more current usage patterns do not match said one or more stored usage patterns, said one or more current usage patterns are recorded as one or more new usage patterns;
    identifying one or more bugs by:
        automatically generating a set of new test matrices based on said one or more new usage patterns;
        automatically running said set of new test matrices on the software application while said group of users continue to use the software application;
        recording one or more error messages generated by the software application resulting from running said set of new test matrices on the software application; and
        correlating said one or more error messages being generated by the software application with said one or more new usage patterns to identify said one or more bugs; and
    generating a reporting message to report said one or more identified bugs.

2. The method of claim 1, further comprising the step of applying a fix to the software application, while the software application is being used by the group of users.

3. The method of claim 2, wherein the step of applying said fix further comprises the step of flagging said one or more identified bugs that have been fixed.

4. The method of claim 1, wherein said step of monitoring the software is accomplished by a neural network.

5. The method of claim 4, wherein said one or more new usage patterns are identified by said neural network.

6. The method of claim 4, wherein said step of reporting said one or more identified bugs uses said neural network for reporting.

7. The method of claim 4, further comprising the step of training said neural network with test matrices associated with said one or more stored usage patterns prior to providing the software application to said group of users.

8. The method of claim 1, further comprising the step of flagging said one or more identified bugs that have not been fixed, but were previously reported.

9. The method of claim 1, wherein said one or more stored usage patterns are associated with the software application prior to providing the software application to said group of users.

10. The method of claim 1, wherein said reporting message generation is based on a predefined reporting standard.

11. The method of claim 1, wherein identifying said one or more bugs further includes correlating said one or more error messages being generated by the software application with said one or more stored usage patterns to identify said one or more bugs.

12. A system for identifying bugs in a software application that is capable of being used by multiple users simultaneously comprising:
    a cloud server for hosting the software application, wherein the software application is provided to a group of users through said server;
    a database for storing one or more sets of usage data from the software application, said one or more sets of usage data include one or more current usage patterns and one or more error messages; and
    a neural network operatively connected to a cloud server, said neural network configured to receive said one of more sets of usage data from said database, wherein said neural network analyzes said one or more sets of usage data by:
        comparing said one or more current usage patterns to one or more stored usage patterns, wherein if said one or more current usage patterns do not match said one or more stored usage patterns, said one or more current usage patterns are recorded as one or more new usage patterns;
        identifying one or more bugs using the following steps:
            automatically generating a set of new test matrices based on said one or more new usage patterns;
            automatically running said set of new test matrices on the software application while said group of users continue to use the software application;
            recording said one or more error messages generated by the software application resulting from running said set of new test matrices on the software application; and
            correlating said one or more error messages being generated by the software application with said one or more new usage patterns to identify said one or more bugs; and
        generating a reporting message to report said one or more identified bugs.

13. The system of claim 12, further comprising a technical module configured to handle said reporting message and selectively apply a fix to said one or more identified bugs in the software application.

14. The system of claim 13, wherein said technical module applies said fix to the software application, while the software application is being used by the group of users.

15. The system of claim 14, wherein said one or more identified bugs that have been fixed by said technical module are flagged.

16. The system of claim 12, wherein said one or more identified bugs that have not been fixed by said technical module, but were previously reported are flagged.

17. The system of claim 12, wherein said neural network is trained with test matrices associated with said one or more stored usage patterns prior to the software application being provided to said group of users.

18. The method of claim 12, wherein said one or more stored usage patterns are associated with the software application prior to providing the software application to said group of users.

19. The system of claim 12, wherein said reporting message generation is based on a predefined reporting standard.

20. The system of claim 12, wherein identifying said one or more bugs further includes correlating said one or more error messages being generated by the software application with said one or more stored usage patterns to identify said one or more bugs.

21. A computing device for identifying bugs in a software application comprising:
    a neural network module including a neural network operatively connected to a cloud server, said cloud server configured to host the software application and provide the software application to a group of users, the software application capable of being used by multiple users simultaneously, said neural network configured to receive said one of more sets of usage data from said database, wherein said neural network analyzes said one or more sets of usage data by:
        comparing said one or more current usage patterns to one or more stored usage patterns, wherein if said one or more current usage patterns do not match said one or more stored usage patterns, said one or more current usage patterns are recorded as one or more new usage patterns;
        identifying one or more bugs using the following steps:
            automatically generating a set of new test matrices based on said one or more new usage patterns;
            automatically running said set of new test matrices on the software application while said group of users continue to use the software application;
            recording said one or more error messages generated by the software application resulting from running said set of new test matrices on the software application; and
            correlating said one or more error messages being generated by the software application with said one or more new usage patterns to identify said one or more bugs; and
        generating a reporting message to report said one or more identified bugs; and
    a reporting module for sending and receiving information related to said one or more identified bugs, including said reporting message.

22. The device of claim 21, wherein said one or more sets of usage data are sent to a database prior to being received by said neural network.

23. The device of claim 21, further comprising a technical module configured to receive information related to said one or more identified bugs and selectively apply a fix to said one or more identified bugs in the software application while the software application is being used by said group of users.

24. The device of claim 23, wherein said one or more identified bugs that have been fixed by said technical module are flagged.

25. The device of claim 21, wherein said one or more identified bugs that have not been fixed, but were previously reported in said reporting module are flagged.

26. The device of claim 21, wherein said neural network is trained with test matrices associated with said one or more stored usage patterns prior to the software application being provided to said group of users.

* * * * *